May 26, 1953     J. W. LESS     2,639,435
COLLAR ATTACHMENT
Filed Feb. 12, 1951
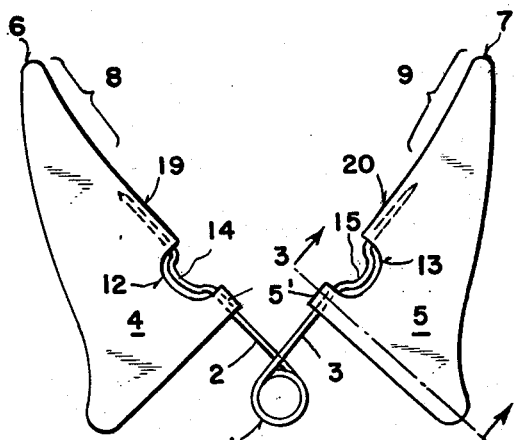
FIG. 1
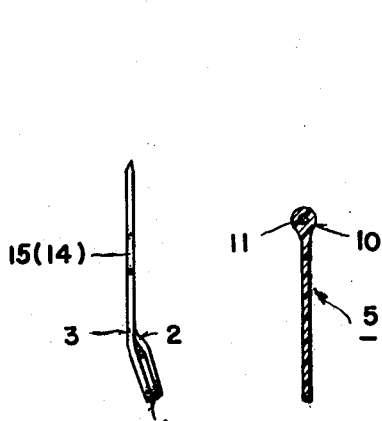
FIG. 2    FIG. 3
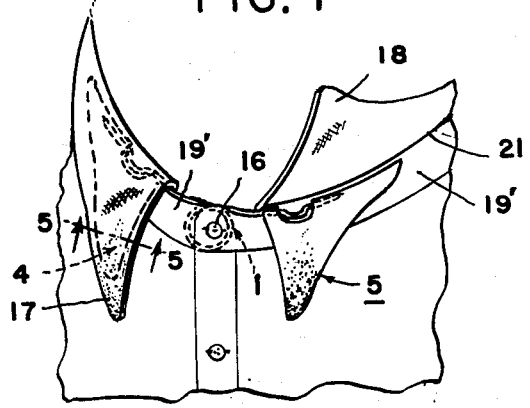
FIG. 4
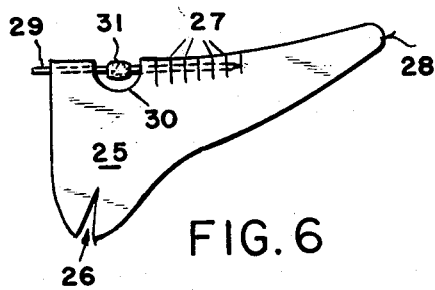
FIG. 6
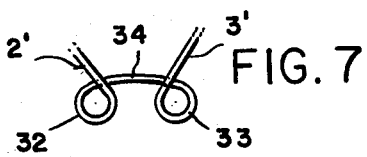
FIG. 7
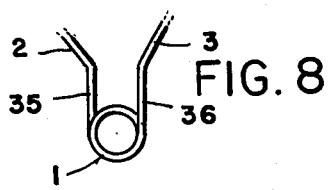
FIG. 8
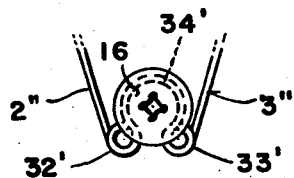
FIG. 5
FIG. 9
INVENTOR,
JOSEPH W. LESS,
BY *Stone, Boyden & Mack*
ATTORNEYS.

Patented May 26, 1953

2,639,435

UNITED STATES PATENT OFFICE 2,639,435

COLLAR ATTACHMENT

Joseph W. Less, Clinton, Iowa

Application February 12, 1951, Serial No. 210,453

8 Claims. (Cl. 2—132)

This invention relates to collar attachments, and particularly to novel means for supporting and shaping the wings of a soft shirt collar of the turned down type.

Many attempts have been made in the prior art to provide collar attachments which would prevent the wings of a soft collar from curling outwardly. Such devices usually take the form of metal pins for clamping the collar wings, or of spring devices having arms which underlie the collar wings and have pointed tips to impale and position the tip portions of the wings. Most prior-art devices of this type depend for their action upon some sort of positive engagement with the collar wing, either in the nature of a clamping action or by having the collar wings actually pierced by a pin. Unlike such relatively crude mechanical devices, the present invention provides collar wing shaping and supporting members which underlie the collar wings but have no means for clamping, piercing or otherwise positively engaging the material of the collar.

Besides eliminating crude mechanical clasps and pins, the present invention is particularly advantageous in that it provides simple, inexpensive and easily attached means for imparting an attractive convex shape to the wings of a soft collar.

In order that these and other features of the invention may be readily understood, reference is had to the accompanying drawings which form a part of this specification and wherein:

Fig. 1 is a plan view of a complete collar attachment constructed in accordance with a preferred embodiment of the invention;

Fig. 2 is a side elevation of a spring arm unit included in the device shown in Fig. 1;

Fig. 3 is a sectional view taken on the line 3—3, Fig. 1;

Fig. 4 is a perspective view showing the device illustrated in Fig. 1 in the position in which it is worn;

Fig. 5 is a sectional view taken on the line 5—5, Fig. 4;

Fig. 6 is a plan view of a modified form of collar wing supporting and shaping element which can be employed in the embodiment of the invention illustrated in Fig. 1;

Fig. 7 is a detail view of a modified form of spring means adaptable to the structure disclosed in Fig. 1;

Fig. 8 is a detail view of another spring device which may be incorporated in the embodiment of the invention shown in Fig. 1, and, Fig. 9 is a detail view of still a further modification of the spring device, in this instance being adapted for engagement behind a collar button.

Referring now to the drawings in detail, and first to Fig. 1 thereof, it will be seen that the device as shown comprises a torsion spring 1 having its ends extended to form a pair of divergent arms 2 and 3. The spring 1 and the arms 2 and 3 are preferably formed from a single piece of small diameter spring wire and, as seen in Fig. 2, the structure is such that the arms 2 and 3 lie in a single plane which is at a slight angle to the plane of the torsion spring 1.

Carried respectively by the arms 2 and 3 are the generally triangular collar wing supporting and shaping members 4 and 5. The generally triangular members 4 and 5 are made somewhat smaller than the collar wings which they are to support, and are positioned with their bases adjacent the torsion spring 1 so that each of the members 4 and 5 tapers toward the end of the corresponding arm 2, 3. The members 4 and 5 terminate in apices 6 and 7, respectively, which extend beyond the ends of the corresponding arms 2 and 3. At its tip, or apex, each of the members 4 and 5 is provided with a portion 8 and 9, respectively, offset toward the space between the divergent arms 2 and 3, so that it may be said that each of the members 4 and 5 has an extension directed toward said space.

The members 4 and 5 are preferably formed of a flexible but self-sustaining sheet material. For example, these members may be formed from impregnated fabric of the types ordinarily employed in shirt collar manufacture. Or they may be fabricated from synthetic plastic sheet material, such as cellulose acetate sheet. Similarly, the members 4 and 5 may be molded from any suitable flexible plastic material. In a preferred embodiment, as illustrated in Fig. 3, members 4 and 5 are each of molded plastic and include an enlarged portion or rib 10 extending along one side and provided with a bore 11 positioned centrally of said enlarged portion. The bore 11 in each of the members 4 and 5 receives the corresponding arm 2, 3. In order that the members 4 and 5 may be secured on the arms 2 and 3, cut out portions 12 and 13 are provided in the members 4 and 5 and the arms 2 and 3 are bent to form stops 14 and 15. The stops 14 and 15 are preferably of somewhat larger diameter than the edge portions 5′ of the members 4 and 5, as shown, so as to facilitate insertion of the arms 2 and 3 into the bores 11.

When the collar attachment is worn, as seen in Fig. 4, the spring 1 is placed between the neck band 19' of the collar and the skin of the wearer and, with the wings 17 and 18 of the collar turned up, the arms 2 and 3 are bent downwardly, across the upper edge of the neck band, until the edges 19 and 20 of the members 4 and 5 are brought into engagement with the under surface of the fold line 21. The collar wings are then returned to their normal positions, as indicated at 17 in Fig. 4. When the collar attachment is worn, the members 4 and 5, being confined between the collar and the shirt, are forced to assume the curvature of the collar about the neck of the wearer. Further, the edges 19 and 20 of the members 4 and 5 are urged against the fold line 21 of the collar by the resilient action of the spring 1 and the arms 2 and 3. Such action forces the extensions or offset portions 8 and 9 of the members 4 and 5 downwardly so that the upper edges of the extensions 8 and 9 are brought into alinement with the edges 19 and 20 of the members 4 and 5. If the members 4 and 5 were not curved about the neck of the wearer, such displacement of the extensions 8 and 9 would force the main body portions of the members 4 and 5 to assume either a convex or a concave shape. But, as seen from Fig. 4, the fact that the members 4 and 5 are curved about the neck of the wearer, causes the downward displacement of the offset portions 8 and 9 to result in a convex curvature of the main body portions of the collar supporting and shaping members. Since the supporting and shaping members 4 and 5 underlie the collar wings 17 and 18, and the collar wings are somewhat tensioned thereagainst by reason of the collar being buttoned, the convex form of the members 4 and 5 is obviously imparted to the collar wings. Thus, the collar wings assume a convex shape, and normal tendency to curl outward is overcome.

In the modified form of collar wing supporting and shaping member 25, shown in Fig. 6, there is provided toward the base of the member a slot 26 so that the member 25 will more readily assume a convex shape. Further, the member 25 is provided with a series of slits 27 at right angles to and extending inwardly from the edge of the member which is to engage the collar fold line. The slits 27 serve to aid in the downward displacement of the tip 28 of the member 25 when the device is worn. The embodiment of the invention shown in Fig. 5 also includes a modified form of stop for securing the collar supporting and shaping member on its supporting arm 29. Member 25 is again provided with a cut out portion 30 through which the arm 29 extends and, after the arm 29 is inserted in the member 25 with the tip of the arm exposed in the cut out portion 30, a stop member 31 is slipped over the end of the arm 29, the arm then being fully inserted in the member 25. With the parts in relation shown in Fig. 5, the member 31 may then be locked in place, as by being compressed with any suitable tool. Or, if desired, the arm 29 may be provided with threads, not shown, and the stop member 31 may be any suitable type of nut capable of being threaded on to the arm.

It will be noted that in the embodiment of the invention shown in Fig. 1, the torsion spring 1 constitutes spring means which connects the arms 2 and 3 at their near ends and which is capable of being engaged behind the collar band, that is, between the collar band and the wearer's skin, when the wing supporting and shaping members 4 and 5 are engaged under the fold line of the collar. While the torsion spring 1 represents a preferred spring means for this purpose, other spring means may be employed.

For example, in Fig. 7, the arms 2' and 3' are shown as terminating in a pair of loops 32 and 33, respectively, the loops being connected together by a portion 34, so that the structure includes a pair of one-turn torsion springs separated by a resilent spreader. Also, the torsion spring means of Fig. 1 may be modified somewhat without departing from the use of a single spring. For instance, in the structure illustrated in Fig. 8, the body of the single torsion spring 1 is separated from the divergent arms 2 and 3 by spaced parallel portions 35 and 36. The structure shown in Fig. 8 has the advantage that the torsion spring is located more toward the bottom edge of the neck band when worn, because of the extension portions 35 and 36, and is thus more firmly held in position.

While in the embodiments of the invention so far discussed the spring means is adapted to be engaged behind the neck band when the attachment is worn, it will be understood that the same result can be obtained if the spring means is constructed for engagement with the collar button. Spring means adapted for this purpose is shown in Fig. 9. Here, the arms 2'' and 3'' terminate respectively in torsion springs 32' and 33' and, as in the construction of Fig. 7, these torsion springs are joined by an intermediate portion 34'. As seen in Fig. 8, however, the intermediate portion 34' is in the form of a loop somewhat smaller than the collar button 16, so that the loop may be engaged behind the collar button when the attachment is worn, with the upper portion of the loop passing over the thread or other means attaching the collar button to the shirt.

I claim:

1. In a device of the class described, the combination of a pair of arms, spring means connecting said arms and maintaining said arms in a normally divergent position when said spring means is relaxed, and a pair of generally triangular collar wing supporting and shaping members of flexible material carried one by each of said arms, each of said collar wing supporting and shaping members being positioned with one apex thereof pointing in the same direction as the free end of the arm carrying said member, and the point of each collar wing supporting and shaping member defining said one apex being offset toward the space between said arms when said arms are in said divergent position, said arms being movable into general alignment with each other against the action of said spring means to enable insertion of said collar wing supporting and shaping members beneath the wings of a collar, and the tension of said spring means urging the offset portions of said supporting and shaping members against the fold line of the collar, when the device is worn, to cause said supporting and shaping members to be flexed into convex form so as to impart such form to the collar wings overlying said members.

2. A device constructed in accordance with claim 1 and wherein each arm carrying one of said collar supporting and shaping members extends adjacent to and parallel with the side of said one member nearest the space between said arms when said arms are in their normally divergent position.

3. A device constructed in accordance with claim 1 and wherein said spring means is of such thickness as to be insertable between a shirt collar and the skin of the wearer when the collar is worn.

4. In a device of the type described, the combination of a torsion spring having its ends extended to form a pair of normally divergent arms, and a pair of flexible generally triangular collar wing supporting and shaping members, each of said members being mounted on one of said arms with one apex of the triangle thereof pointing in the same direction as the free end of the arm carrying said member, the side of each of said generally triangular members adjacent the space between said arms when in their normally divergent position extending generally parallel to the arm carrying said member but being offset toward said space at said apex, said arms being movable against the action of said torsion spring into general alignment with each other to enable insertion of said collar wing supporting and shaping members beneath the wings of a collar, and the tension of said spring urging the offset portions of said supporting and shaping members against the fold line of the collar, when the device is worn, to cause said supporting and shaping members to be flexed into convex form so as to impart such form to the collar wings overlying said members.

5. A device constructed in accordance with claim 4 and wherein said arms lie in the same plane when said spring is relaxed, and the plane of said spring lies at an angle to the plane of said arms to facilitate insertion of said spring between a shirt collar and the skin of the wearer.

6. In a device of the type described, the combination of a pair of arms, spring means connecting said arms and normally maintaining said arms in a divergent position when said spring means is relaxed, and a pair of generally triangular collar wing supporting and shaping members formed of flexible material, each of said members having one of said divergent arms enclosed therein and extending adjacent and parallel to a portion of one side thereof, the triangle of each of said members tapering to an apex beyond the tip of the arm enclosed in said member, and each of said members being provided at said apex with a portion offset toward the space between said arms when said arms are in said divergent position, said arms being movable against the action of said spring means into general alignment with each other to enable insertion of said collar wing supporting and shaping members beneath the wings of a collar, and the tension of said spring means urging the offset portions of said supporting and shaping members against the fold line of the collar, when the device is worn, to cause said supporting and shaping members to be flexed into convex form so as to impart such form to the collar wings overlying said members.

7. In a device of the type described, the combination of a torsion spring having its ends extended to form a pair of normally divergent arms, and a pair of generally triangular collar wing supporting and shaping members formed of flexible material, each of said supporting and shaping members being provided with an enlarged portion extending along one side of the triangle thereof and a bore in said enlarged portion parallel with said one side and enclosing one of said arms so that the triangle of each of said supporting and shaping members has one apex pointing in the same direction as one of said arms, each of said supporting and shaping members being provided at said one apex thereof with a portion offset toward the space between said arms when said arms are in their normally divergent position, said arms being movable against the action of said spring into general alignment with each other to enable insertion of said supporting and shaping members beneath the wings of a collar, and the tension of said spring urging said offset portions of said supporting and shaping members against the fold line of the collar, when the device is worn, to cause said supporting and shaping members to be flexed into convex form so as to impart such form to the collar wings overlying said members.

8. In a device of the type described, the combination of a pair of arms, spring bridge means connecting said arms and constructed for insertion behind the button of a shirt collar to lie above the means attaching the button to the collar, said spring bridge means maintaining said arms in a normally divergent position when said spring bridge means is relaxed, and a pair of flexible generally triangular collar wing supporting and shaping members, each of said supporting and shaping members being mounted on one of said arms with one apex thereof pointing in the same direction as the free end of the arm carrying said member and having a portion at said one apex offset toward the space between said arms when said arms are in their normally divergent position, said arms being movable against the action of said spring bridge means into general alignment with each other to enable insertion of said supporting and shaping members beneath the wings of a collar when said spring bridge means is engaged behind the collar button, and the tension of said spring bridge means urging the offset portions of said supporting and shaping members against the fold line of the collar, when the device is worn, to cause said supporting and shaping members to be flexed into convex form so as to impart such form to the collar wings overlying said members.

JOSEPH W. LESS.

References Cited in the file of this patent

UNITED STATES PATENTS

| Number | Name | Date |
|---|---|---|
| 1,873,648 | Keinath | Aug. 23, 1932 |

FOREIGN PATENTS

| Number | Country | Date |
|---|---|---|
| 454,096 | France | June 26, 1913 |